United States Patent [19]

Marino et al.

[11] 4,349,966

[45] Sep. 21, 1982

[54] CUTTING GUIDE AND MEASURING DEVICE

[76] Inventors: Michael J. Marino, 223 Westville Ave., West Caldwell, N.J. 07006; Michael R. Marino, 38 Alta Way, Corte Madera, Calif. 94925

[21] Appl. No.: 245,353

[22] Filed: Mar. 19, 1981

[51] Int. Cl.³ .............................................. B43L 7/00
[52] U.S. Cl. ........................................ 33/489; 30/289
[58] Field of Search ................ 33/489, 492, 484, 485; 30/273, 274, 286, 289

[56] References Cited

U.S. PATENT DOCUMENTS

| 470,754 | 3/1892 | Hartig | 33/483 |
| 781,117 | 1/1905 | Willits | 33/492 |
| 1,984,273 | 12/1934 | Kuechenmeister | 33/492 |
| 2,230,010 | 1/1941 | Owens | 33/489 |
| 2,930,123 | 3/1960 | Clark | 30/273 |
| 3,406,456 | 10/1968 | Schleich | 33/492 |

FOREIGN PATENT DOCUMENTS

| 846968 | 6/1952 | Fed. Rep. of Germany | 33/489 |
| 921010 | 4/1947 | France | 33/492 |
| 934930 | 1/1948 | France | 33/492 |

Primary Examiner—Charles E. Phillips
Attorney, Agent, or Firm—Weingram & Klauber

[57] ABSTRACT

A cutting guide includes an elongated wide flat base plate having ruled markings along one edge and a raised flange along the opposite edge. The raised edge serves as a linear guide for a cutting tool, such as a utility knife, while providing a protective barrier to prevent the sharp knife blade from slipping over the edge and causing injury to the user. A plurality of beveled feet along the lower surface of the base provide structural support and an improved gripping surface to prevent undesired movement during use. The wide base also facilitates holding the guide down firmly against the material being cut to permit steady and efficient operation.

7 Claims, 3 Drawing Figures

CUTTING GUIDE AND MEASURING DEVICE

BACKGROUND OF THE INVENTION

1. Field of Invention

The present invention relates to straight edge guides for use in cutting and measuring materials and particularly to an improved guide having a raised protective edge and feet providing support and gripping surfaces.

2. Description of the Prior Art

Cutting guides having raised straight edges for use with various materials are known, such as shown in U.S. Pat. No. 3,915,045, issued Oct. 28, 1975. These generally did not have ruled markings for measurement purposes along an opposite edge and did not have feet for supporting the guide and gripping the surface of the material to be cut. Other devices, such as shown in U.S. Pat. No. 3,363,319, use foot pads and rubber gripping surfaces for marking guides, but these are in different configurations for different purposes.

SUMMARY OF THE INVENTION

It is therefore a primary object of the present invention to provide a cutting guide and measuring device having an improved support structure and gripping surface.

It is another object of the present invention to provide an elongated guide having a raised cutting edge along one side, ruled markings along the opposite side and a wide flat base plate that can be held down firmly against the material to be cut.

These objects are achieved with a novel straight edge guide having a plurality of elongated beveled feet projecting from the lower surface of the flat base to provide structural support and gripping of the material. The base plate is also sufficiently wide so that it can accommodate the hand or knee of the user to hold the guide firmly in position.

Other objects and advantages of this invention will become apparent from the following detailed description when viewed in conjunction with the accompanying drawings.

DETAILED DESCRIPTION OF THE PREFERRED EMBODIMENT

Figure 1:
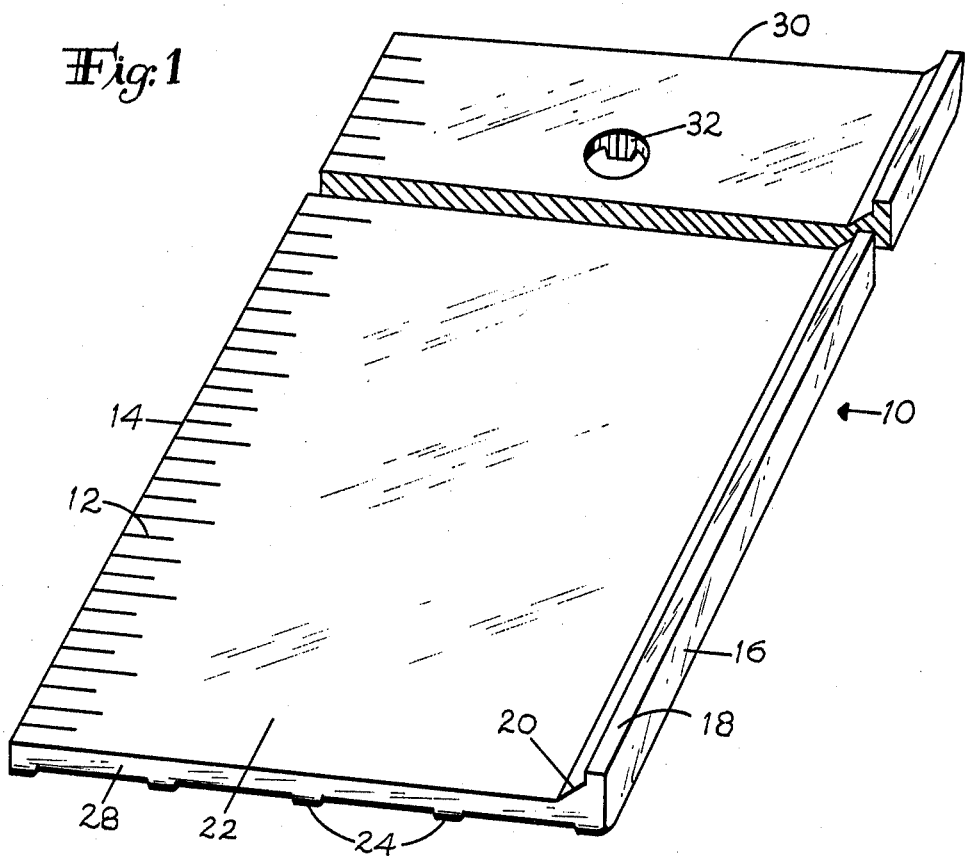
FIG. 1 is an end isometric view of a portion of the cutting guide and measuring device of the present invention.

As shown in FIG. 1, an elongated cutting guide 10, preferably 1 meter to 5 feet in length, has ruled markings 12 along one side 14. The guide is formed of an integral body of a suitable strong, light, durable material, such as anodized aluminum, having either metric or standard inch scales, or both, printed on the upper surface. The opposite side 16 includes a raised vertical flange 18 which serves as a straight edge for guiding a suitable cutting tool, such as a utility knife, used for cutting materials such as resilient floor coverings. The raised flange is of a sufficient height, such as ⅜ inch, to prevent the knife blade from slipping over the edge and causing injury to the user. The flange includes an angled inner wall surface 20 to provide added strength and reinforcement for accurate extrusions of the long guide and to ensure accuracy in cutting along the guide edge. The angle may typically be about 45° and extend about ⅛ inch above the flat base plate 22, with the thickness of the flange and the base plate also being about ⅛ inch.

Figure 2:
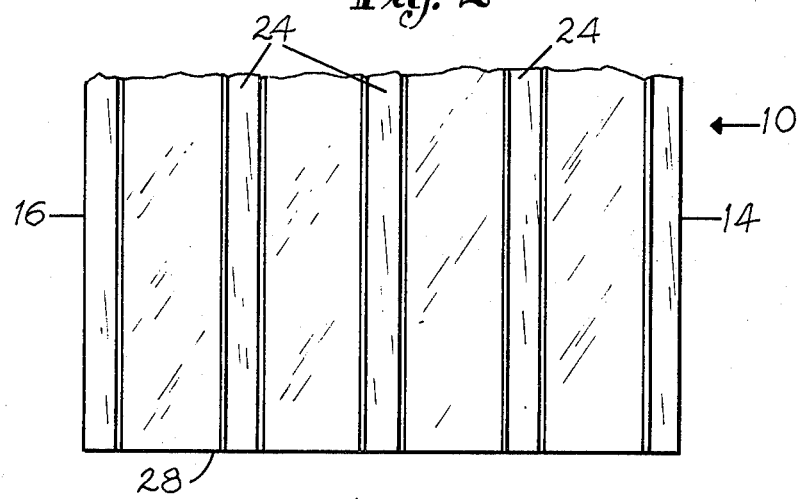
FIG. 2 is a partial, bottom view of the device shown in FIG. 1 showing the elongated support feet.
Figure 3:
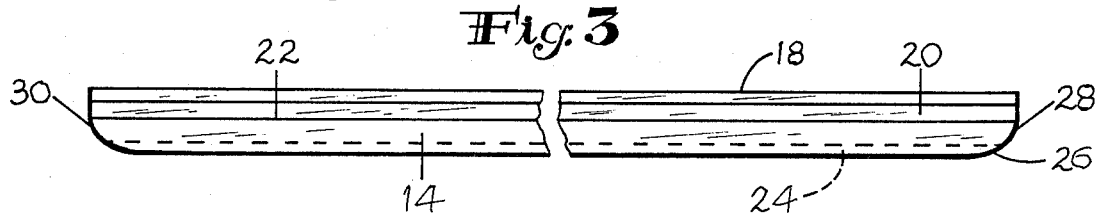
FIG. 3 is a side view of an end portion of the device shown in FIG. 1.

Along the full length of the lower surface of the base plate, as shown in FIG. 2, are a plurality of parallel longitudinal, equally-spaced feet 24 which provide improved gripping of the material to be cut and additional strength during extrusion as well as use. The five feet may typically be about ⅛ inch wide with beveled inner sides at a 45° angle and which project about 3/64 inch in height below the base plate. The feet can penetrate the material below the guide to minimize sideways movement during the cutting operation. In addition, as shown in FIG. 3, the lower leading edge 26 of the feet 24 at the forward end 28, as well as the back end 30, have rounded corner surfaces to facilitate sliding of the guide forward or backward along the material when placing it in position before cutting.

The width of the flat base plate 22 is preferably sufficient to accommodate the knee and hand of the user to permit holding the guide securely in position on the surface of the material for accurate cutting. This dimension is typically about 3½ inches. A hole 32, about ½ inch in diameter, is provided about 1¼ inch from the top end 30 to permit hanging of the guide on a wall for storage.

While only a single embodiment has been illustrated and described, it is apparent that many variations may be made in the particular design, configuration, size and material without departing from the scope of the invention as set forth in the appended claims.

What is claimed is:

1. A cutting guide and measuring device comprising:
    an elongated flat base having ruled markings along one side of the upper surface, and an integral vertical raised flange along the opposite side forming a straight edge for guiding a cutting tool; and
    at least three parallel longitudinal feet spaced across the width and extending along the lower surface of said base, said feet being integral with and of the same material as said base and flange and adapted to grip the surface of the material to be cut so as to inhibit sideways movement of said guide, said feet having rounded lower front and back longitudinal leading edges at the opposite ends of said base to facilitate longitudinal movement along said surface.

2. The device of claim 1 wherein said feet are spaced equally across the width of said base.

3. The device of claim 2 wherein said base is of a sufficient width to accommodate a knee and hand of a user and said feet provide structural support across said width.

4. The device of claim 3 wherein said flange includes an angled support surface joining the inner wall of said flange and said upper surface of said base.

5. The device of claim 4 including a hole through said base adjacent one end.

6. The device of claim 4 wherein said base flange and feet are of an integral metal body.

7. The device of claim 3 wherein said feet have beveled sides adapted to penetrate a resilient material.

* * * * *